United States Patent
Yang et al.

(10) Patent No.: US 8,260,780 B2
(45) Date of Patent: *Sep. 4, 2012

(54) PROTECTION OF DATABASE OPERATIONS

(75) Inventors: Xiaosong Yang, Palo Alto, CA (US); Lin Chen, San Jose, CA (US); Changming Liu, Cupertino, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/939,555

(22) Filed: Nov. 4, 2010

(65) Prior Publication Data

US 2011/0047154 A1 Feb. 24, 2011

Related U.S. Application Data

(63) Continuation of application No. 11/428,205, filed on Jun. 30, 2006, now Pat. No. 7,853,591.

(51) Int. Cl.
*G06F 7/00* (2006.01)

(52) U.S. Cl. ........ 707/736; 707/953; 711/129; 711/170; 711/173

(58) Field of Classification Search .................. 707/736
See application file for complete search history.

(56) References Cited

U.S. PATENT DOCUMENTS

| 5,420,983 | A | | 5/1995 | Noya et al. |
| 5,815,415 | A | * | 9/1998 | Bentley et al. ................. 703/4 |
| 5,907,709 | A | * | 5/1999 | Cantey et al. ................. 717/141 |
| 7,181,585 | B2 | | 2/2007 | Abrashkevich et al. |
| 7,549,038 | B1 | | 6/2009 | Roux |
| 7,853,591 | B1 | | 12/2010 | Yang et al. |
| 2003/0187888 | A1 | | 10/2003 | Hayward |
| 2006/0106832 | A1 | * | 5/2006 | Ben-Dyke et al. ........... 707/100 |
| 2006/0136455 | A1 | | 6/2006 | Wen et al. |
| 2008/0282057 | A1 | | 11/2008 | Layden et al. |

* cited by examiner

*Primary Examiner* — Christyann Pulliam
*Assistant Examiner* — Mellissa M Chojnacki
(74) *Attorney, Agent, or Firm* — Harrity & Harrity, LLP

(57) ABSTRACT

A system protects database operations performed on a shared resource. The system may chunk memory to form a set of memory chunks which have memory blocks, at least some of the memory blocks including database objects. The system may configure at least one binary search tree using the memory chunks as nodes and buffer a set of pointers corresponding to the memory blocks. The system may further validate the buffered pointers and dereference validated buffered pointers.

20 Claims, 5 Drawing Sheets

PROTECTION OF DATABASE OPERATIONS

RELATED APPLICATION

This application is a continuation of U.S. patent application Ser. No. 11/428,205, filed Jun. 30, 2006, the contents of which are incorporated in their entirety herein by reference.

FIELD OF THE INVENTION

Implementations described herein relate generally to database management systems, and more particularly, to database management systems using pointer-based data structures.

BACKGROUND OF THE INVENTION

In memory devices, databases are often used in applications to collect and organize a set of related data objects. For example, an intrusion detection and prevention system may use a database to store attack signatures; a firewall may use a database to store policies; an address book may use a database to store addresses, etc. Databases vary in size, and may include upwards of thousands of database objects.

Database management may include performing operations on a database object, such as insertion, deletion, updating, and searching. Such operations may be accomplished in O(n) time in database systems in which database objects are arranged in a linked-list type of data structure (where O is the Landau or big-O notation, and n is the number of objects in the database). Some database operations, on the other hand, may require in-order iteration or traversal over most or all of the database objects. The amount of time associated with iterating n database objects may approximate O(C*n), where C may be a (large) constant. In a database where n is large, O(C*n) may be deemed too long of a time to lock (i.e., grant exclusive access to) the database such that other operations cannot be performed on the database during the iteration. Accordingly, a database management system may allow shared access to a database such that multiple users may concurrently perform non-preemptive operations on the database.

Generating a list of database objects typically involves buffering references, e.g., pointers, corresponding to the respective database objects, since too much memory would be used to buffer the objects themselves. To display the database object associated with a particular buffered pointer, the content of the associated object may be accessed by dereferencing the buffered pointer. In a database management system that allows non-exclusive access to a database, objects may be deleted from the database by one user, for example, while another user displays a list of the objects corresponding to the buffered pointers. An attempt to access the contents of a database object which has been deleted in the interim by the other user (i.e., dereferencing an invalid pointer), may cause an operating system failure (e.g., system crash) or otherwise create system performance issues.

SUMMARY OF THE INVENTION

According to one aspect, a method may include chunking memory to form multiple memory chunks including memory blocks, at least some of the memory blocks including objects associated with a database; configuring the memory chunks as nodes of at least one binary search tree; buffering a plurality of pointers corresponding to the memory blocks; validating at least one of the buffered pointers; and dereferencing a first validated buffered pointer.

According to another aspect, a computer-readable medium that stores computer-executable instructions may include instructions to store a dataset in multiple memory chunks having associated memory address ranges, the memory chunks including header information corresponding to respective memory addresses associated with a set of memory segments in the memory chunks; instructions to sort the memory chunks to form at least one binary search tree; and instructions to validate a first buffered pointer based on the header information when a request to access a first memory segment is received.

According to yet another aspect, a network device includes a memory to store a dataset in a plurality of memory chunks having associated memory address ranges, the memory chunks including header information corresponding to respective memory addresses associated with a set of memory segments in the memory chunks; and a processor to sort the memory chunks into at least one binary search tree, and validate a first buffered pointer based on the header information when a request to access a first memory segment is received from the processor.

According to yet another aspect, a method includes receiving a request to access a memory space associated with a pointer, the memory space being contained in a memory chunk of a database and including header information; searching multiple nodes of a binary search tree to an end node, the nodes including respective memory chunks, the end node containing the memory space; and determining, based on the header information, whether the memory space associated with the pointer contains a database object.

According to yet another aspect, a database management system includes means for forming a set of memory chunks including two or more memory units; means for sorting the memory chunks to form a binary search tree, the memory chunks being nodes of the binary search tree; means for storing a set of objects in the two or more memory units; means for buffering pointers associated with the respective two or more memory units in which the objects are stored; means for receiving an instruction to retrieve n objects from the two or more memory units associated with n corresponding buffered pointers; and means for determining whether the each of the n objects has been removed from the associated two or more memory units during an interim between the buffering of the pointers and the receiving of the instruction to retrieve.

BRIEF DESCRIPTION OF THE DRAWINGS

The accompanying drawings, which are incorporated in and constitute a part of this specification, illustrate one or more implementations of the invention and, together with the description, explain the invention. In the drawings.

DETAILED DESCRIPTION

The following detailed description of embodiments of the principles of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention may provide protection of database operations by performing buffered pointer validation prior to accessing the contents associated with the buffered pointers. Consistent with principles of the invention, iteration over n database entries may be achieved in an average time, as well as a maximum time, of $O(n*\log(n))$, without locking the entire database. In one exemplary implementation, an increased rate of iterating database entries may be achieved by chunking memory (i.e., forming chunks of memory, each having an associated address range, a header, and a set of memory blocks having associated addresses) to store database information. In another exemplary implementation, an increased rate of iterating database entries may be achieved by sorting memory chunks into binary search trees.

Exemplary System Configuration

Figure 1:
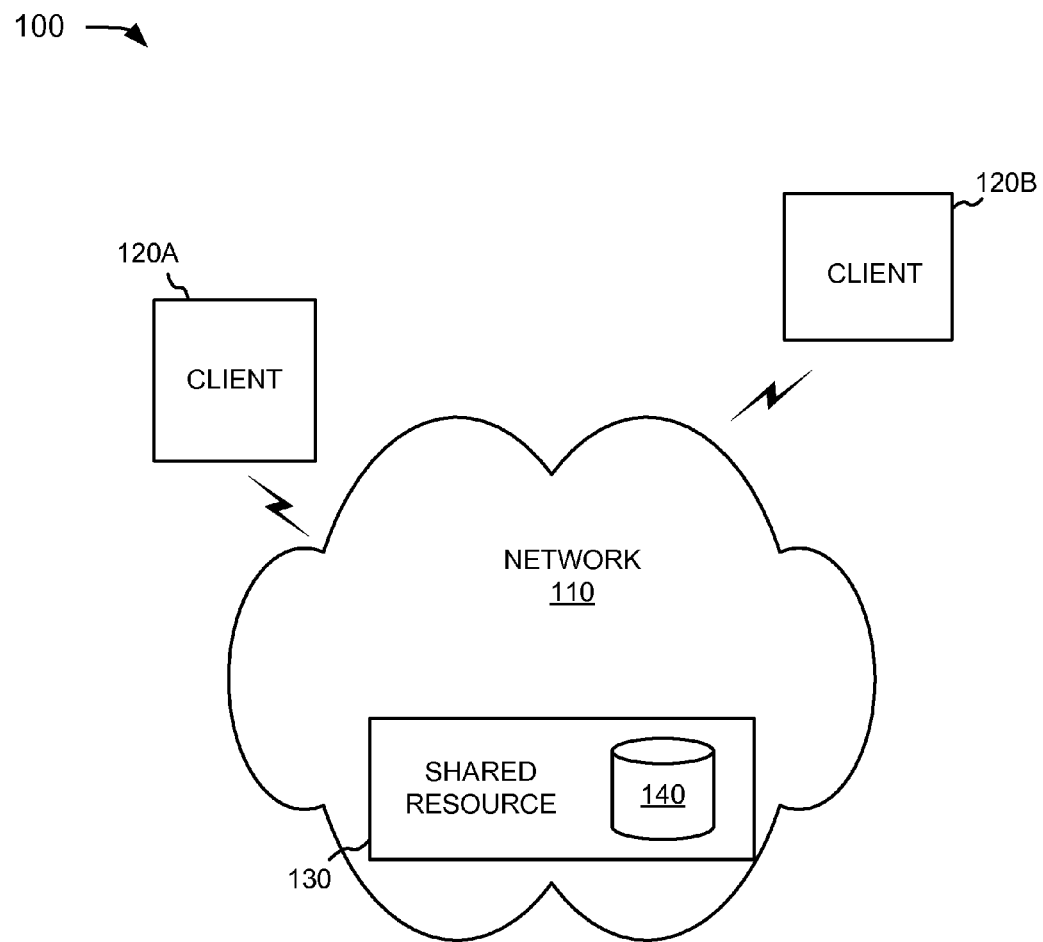
FIG. 1 is an exemplary diagram illustrating a system in which concepts consistent with principles of the invention can be implemented.

FIG. 1 is an exemplary diagram of a system 100 in which concepts consistent with principles of the invention may be implemented. As illustrated, system 100 may include multiple entities, such as network 110, shared resource 130, and client devices 120A and 120B (collectively referred to herein as "client devices 120") that may operably communicate with shared resource 130 via network 110.

In one implementation, client devices 120 may link to network 110, as shown, via any existing technique, such as wired, wireless, and/or optical communication links. The links may include, for example, a broadband connection, such as a digital subscriber line (DSL) connection provided over, for example, shielded twisted pair, a cable modem connection provided over, for example, coaxial cable and/or optical fiber, and/or a wireless connection provided over, for example, a wireless fidelity (Wi-Fi) link and/or free-space link.

The number and type of devices illustrated in FIG. 1 are provided for simplicity. In practice, a typical system in which the invention may be implemented could include more or fewer networks and/or devices that aid in receiving, processing, and/or transmitting data, than what is illustrated in FIG. 1. In addition, devices depicted as single entities may be implemented in a distributed arrangement. Further, in some implementations, functions described as being performed by two or more devices may be performed by a single device.

In one implementation, network 110 may include one or more networks, such as a local area network (LAN), a wide area network (WAN), a public switched telephone network (PSTN), a dial access network (DAN), an intranet, the Internet, or a combination of similar or dissimilar networks.

Client devices 120 may include one or more devices, such as a personal computer, a laptop, a personal digital assistant (PDA), or another type of computation or communication device capable of initiating, processing, transmitting, and/or receiving data (e.g., data packets) and/or voice communications or other media.

Figure 2:
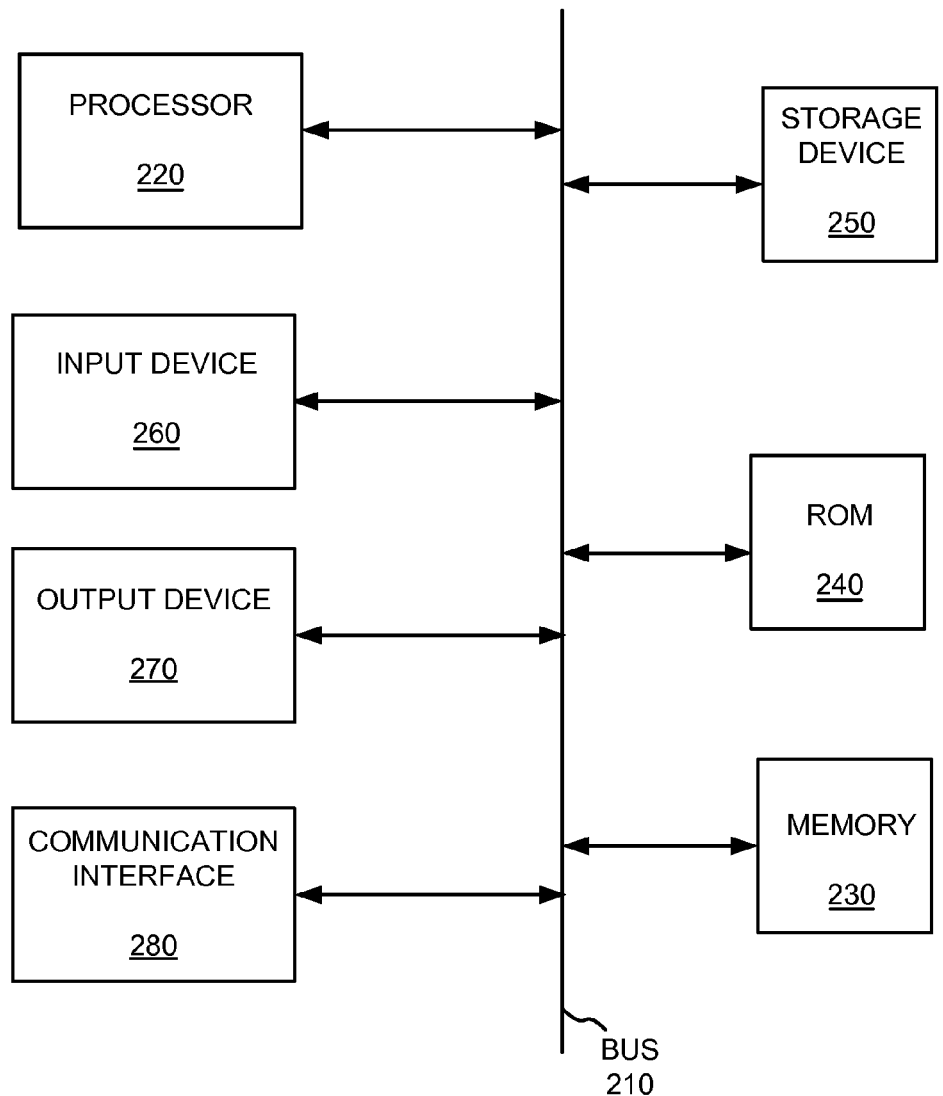
FIG. 2 is an exemplary block diagram of the shared resource of FIG. 1 according to an implementation consistent with principles of the invention.

Shared resource 130 may include one or more devices capable of initiating, processing, transmitting, and/or receiving data via a network device (not shown), such as a firewall, a router, a modem, a gateway, an interface, and the like. An exemplary configuration of shared resource 130 is shown in FIG. 2. Shared resource 130 may have a database 140 associated with it.

Database 140 may include any storage device capable of storing data and may include a group of databases that include a number of database fields in any configuration. Details regarding the specific functionality of database 150 are set forth in additional detail below.

In system 100 exemplified in FIG. 1, client devices 120 may concurrently access shared resource 130 via network 110 to perform operations on database 140. The database operations may be controlled by a database management system. Implementations consistent with principles of the invention include chunking memory used to store database objects, and/or arranging the memory chunks into a binary search tree, as described in more detail below.

FIG. 2 illustrates an exemplary block diagram of shared resource 130 in an implementation consistent with the principles of the invention. Client devices 120 may be similarly configured. Other configurations may alternatively be used. Shared resource 130 may include a bus 210, a processor 220, a memory 230, a read only memory (ROM) 240, a storage device 250, an input device 260, an output device 270, and a communication interface 280. Bus 210 permits communication among the components of shared resource 130.

Processor 220 may include any type of conventional processor, microprocessor, or processing logic that interprets and executes instructions. Memory 230 may include a random access memory (RAM) or another type of dynamic storage device that may store information and instructions for execution by processor 220.

Memory 230 may also be used to store temporary variables or other intermediate information during execution of instructions by processor 220. Memory 230 may include one or more devices, such as a random access memory (RAM), a dynamic RAM (DRAM), a synchronous DRAM (SDRAM), or another type of storage device capable of storing, processing, transmitting, and/or receiving data, such as a database, instructions, and other information. A database associated with an application, which includes n database objects, may be stored, for example, in memory 230.

ROM 240 may include a conventional ROM device and/or another type of static storage device that may store static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to shared resource 130, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables shared resource 130 to communicate with other devices and/or systems. For example, communication interface 280 may include a modem or an Ethernet interface to a LAN. Alternatively, communication interface 280 may include other mechanisms for communicating via a network.

Exemplary Processing

Figure 3:
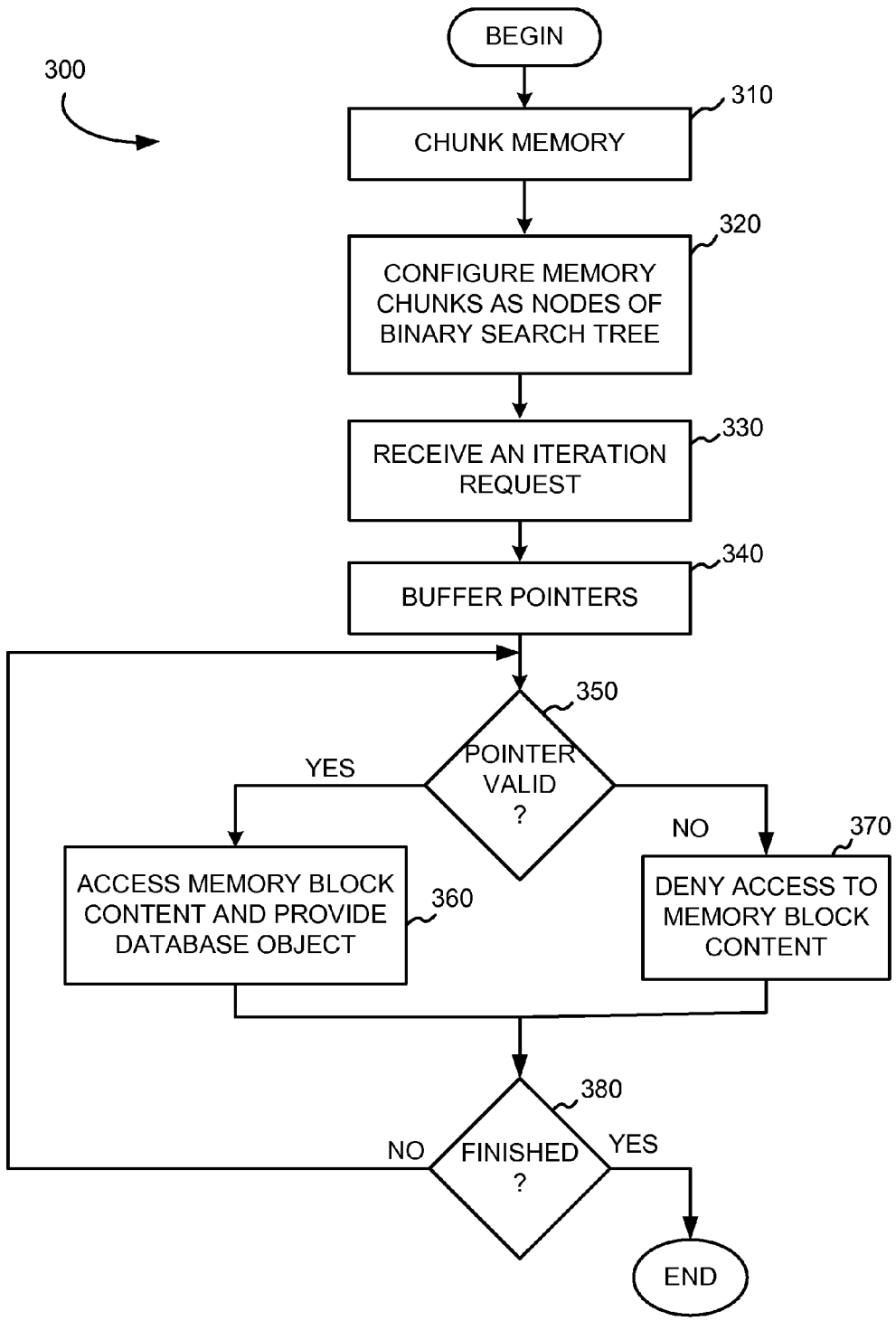
FIG. 3 is a flow diagram illustrating an exemplary process for providing database protection consistent with principles of the invention.
Figure 4:
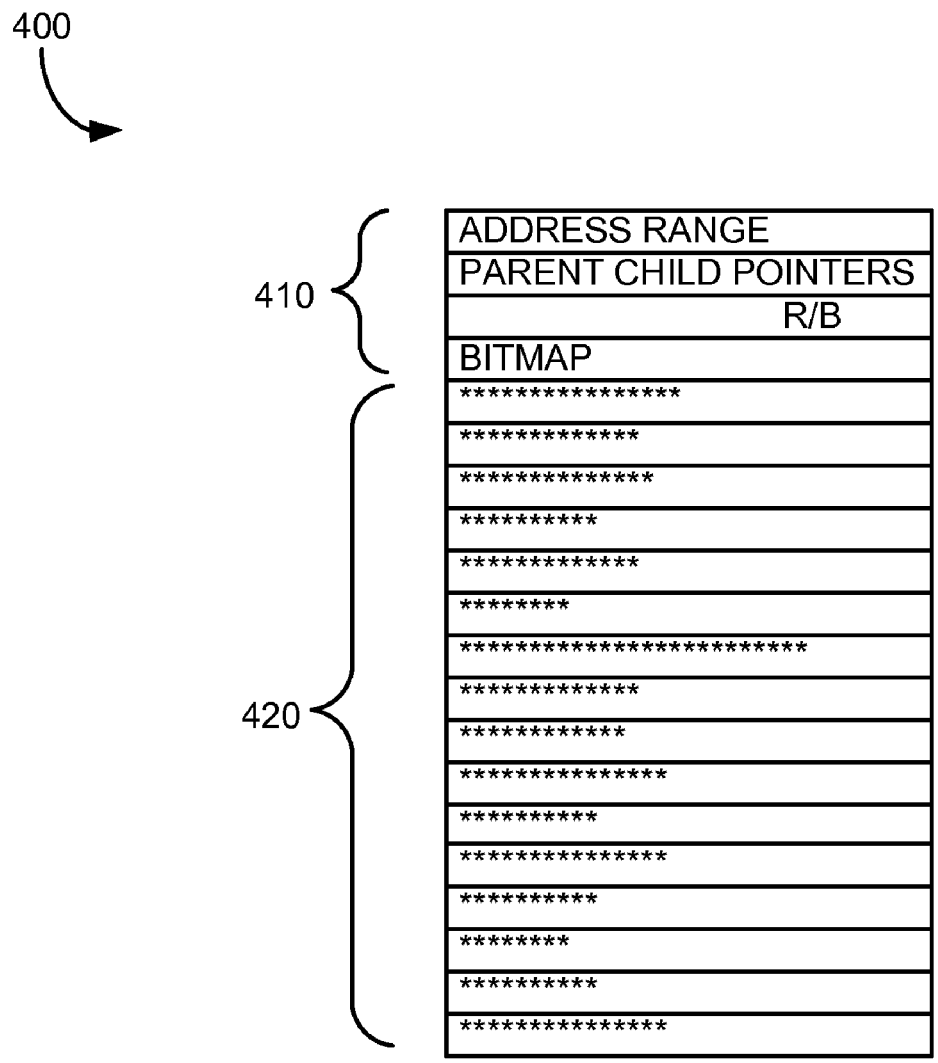
FIG. 4 is an exemplary memory chunk according to an implementation consistent with principles of the invention.

FIG. 3 is a flow diagram illustrating an exemplary process 300 for providing database protection consistent with principles of the invention. In one implementation, the exemplary process may begin by chunking memory associated with database 140 to form a group of memory chunks that each include a set of individual memory blocks in which the contents of the database objects are stored (act 310). The memory blocks may be sized, as appropriate, to store the contents of a database object. A memory chunk may include a header. Header information may include a memory address range associated with a memory chunk. Header information may include a color attribute. For example, a value of the color attribute may be red or black. Header information may include a pointer that identifies a parent node, a left child node, and/or a right child node. Memory addresses associated with the memory blocks of a single memory chunk may be sequential. Header information may include, for example, a bit array or bitmap that indicates whether the respective memory blocks of a memory chunk have content e.g., "1," (i.e., contain a database object) or do not have content, e.g., "0." FIG. 4 is an exemplary memory chunk 400 according to an implementation consistent with principles of the invention. As shown in FIG. 4, for example, memory chunk 400 may include a header 410 and 16 memory blocks 420 for storing database objects. Other numbers of memory blocks may be used.

Figure 5:
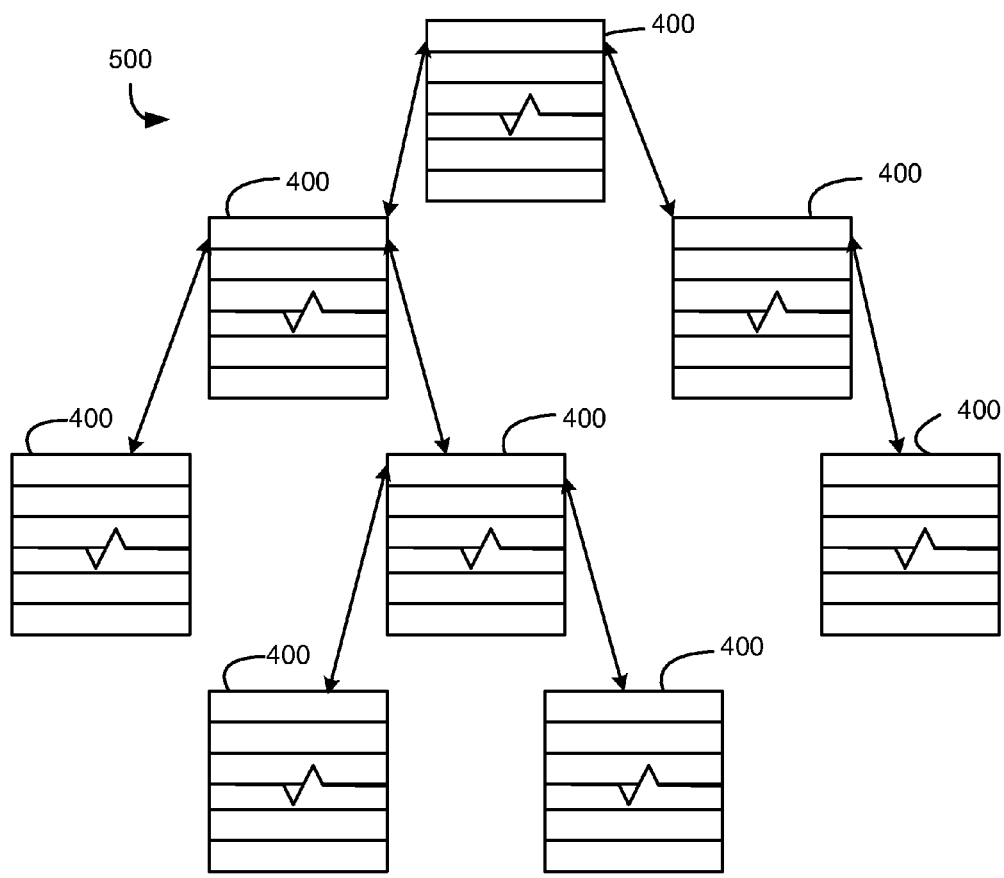
FIG. 5 is an exemplary data structure according to an implementation consistent with principles of the invention.

Returning to FIG. 3, memory chunks formed in act 310, may be configured as nodes of a binary search tree (act 320). The binary search tree may include, for example, an AVL tree, a B– tree, a B+ tree, a self-balancing binary search tree, a 2-3-4 tree, a red-black tree, and/or any other type of binary search tree in which memory chunks are the nodes of the tree. FIG. 5 is an exemplary data structure according to an implementation consistent with principles of the invention. FIG. 5 depicts an illustrative example of multiple chunks 400 conceptually configured as nodes of a tree 500. The nodes may be configured to conform to the properties of the particular type of binary search tree. For example, in a red-black tree, the "root" is black; both children of every red node are black, etc.

Returning to FIG. 3, shared resource 130 may receive an iteration request from a client device 120 for a list of the database objects (act 330). In response, references, such as pointers, corresponding to respective memory blocks in the memory chunks, may be generated and stored in a buffer (act 340).

In one implementation, before the contents of a memory block corresponding to an individual pointer may be accessed (i.e., the value of the pointer dereferenced), the pointer may first be validated (act 350). That is, a determination may be made as to whether the memory address identified by the pointer contains a database object. Validating a pointer at act 350 may be accomplished, for example, by searching a binary search tree in which the memory chunks are arranged as nodes. For example, a buffered pointer value (i.e., a memory address) may be compared with header information that includes a memory address range of the memory blocks of the memory chunk, and the tree searched using header information (e.g., child-parent pointers, color attributes, etc.) until the memory chunk including the pointer value (i.e., the end or leaf node) is located. When the memory chunks are arranged as nodes of a red-black tree, for example, the longest possible path from the root to the target leaf may be no more than twice as long as the shortest possible path in the tree. Accordingly, since database operations, such as inserting, deleting, and finding values requires worst-case time proportional to the height of the tree, the upper theoretical bound on the height of the tree results in optimal efficiency in the worst-case, in contrast to alternative configurations.

Upon locating the target memory chunk, the bit array in the header may be examined to determine whether the address (i.e., the corresponding memory block) either has content or is content-free. Thus, the pointer is validated from header information without accessing the content of the memory block. In one implementation, validating n pointers may be accomplished by iterating n database objects in a maximum (i.e., worst-case) time and/or an average time of $O(n*\log(n))$ (where $\log(n)$ is $\log 2(n)$).

When it is determined that the pointer is valid (i.e., the corresponding memory address contains a database object), access to the memory block may be granted and the content of the memory block (i.e., the database object) may be provided to client 120A (act 360). For instances in which it is determined that the pointer is not valid (i.e., the corresponding memory address is free), access to the memory block may be denied (act 370). In either case, it may be determined whether process 300 is finished or not (Act 380). If not, pointer validation may be resumed at Act 350, else process 300 may end.

For example, after the pointers are buffered (act 350, above), and while the database objects are being displayed on client device 120A (e.g., line-by-line, screen-by-screen, etc.), client device 120B may send a command to shared resource 130 to delete a database object from a memory address to which a particular buffered pointer refers. An attempt to view the deleted database object (i.e., dereference the pointer) will be thwarted after pointer validation determines that the address no longer has content. In this manner, system crashes and/or application performance issues may be avoided.

CONCLUSION

Implementations consistent with principles of the invention provide for protection of database operations where locking (i.e., restricting access to a single user at a time) the database for an extended period is not practicable and thus shared access is permitted. Implementations may provide a pointer validation technique that capitalizes on reduced times for iterating database objects using memory chunking and binary search tree data structures, to thereby advantageously limit iteration times to $O(n*\log(n))$. Accordingly, database management systems consistent with principles of the invention provide substantially improved protection of database operations over typical database management systems.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of operations has been disclosed with regard to FIG. 3, the order of the operations may be varied in other implementations consistent with principles of the invention. Furthermore, non-dependent operations may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. Such logic may include hardware, such as an application specific integrated circuit (ASIC) or a field programmable gate array, software, or a combination of hardware and software. While aspects have been described in terms of processing messages or packets, such aspects may operate upon any type or form of data, including packet data and non-packet data. The term "data unit" may refer to packet or non-packet data.

No element, operation, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   forming, by a first device, a plurality of memory chunks including a plurality of memory blocks that correspond to a plurality of objects;
   receiving, by the first device and from a second device, a first request for a list of the plurality of objects;
   generating, by the first device and based on the request, a plurality of pointers pointing to the plurality of objects;
   buffering, by the first device, the plurality of pointers;
   providing, by the first device, the list of the plurality of objects corresponding to the buffered plurality of pointers to the second device;
   receiving, by the first device and from the second device, a second request to access contents of a first buffered pointer of the plurality of buffered pointers;
   performing, by the first device and based on the second request, a validation of the first buffered pointer;
   dereferencing, by the first device, the first buffered pointer when a result of the validation indicates that the first buffered pointer points to a particular object stored in a particular memory block of the plurality of memory blocks;
   providing, by the first device, the particular object to the second device;
   determining, by the first device, that a third device is attempting to access the particular memory block; and
   denying, by the first device, the third device access to the particular memory block based on the providing the particular object to the second device.

2. The method of claim 1, further comprising:
   receiving, from the second device, a command to delete the particular object from the particular memory block; and
   deleting the particular object from the particular memory block based on the providing the particular object to the second device.

3. The method of claim 2, further comprising:
   providing, to the third device and before deleting the particular object from the particular memory block, the list of the plurality of objects corresponding to the buffered plurality of pointers;
   where determining that the third device is attempting to access the particular memory block includes:
      receiving, from the third device and after deleting the particular object from the particular memory block, a request to dereference the first buffered pointer; and
   where denying the third device access to the particular memory block includes:
      blocking the dereferencing of the first buffered pointer by the third device.

4. The method of claim 1, further comprising:
   configuring the plurality of memory chunks as nodes of at least one binary search tree.

5. The method of claim 4, where the first request comprises a request for an iterative search of the binary search tree.

6. The method of claim 1, further comprising:
   determining whether to grant the second request based on a result of the validation; and
   granting the second request when a particular memory chunk, of the plurality of memory chunks, corresponding to the first buffered pointer, contains the particular object.

7. The method of claim 6, further comprising:
   denying the second request when the particular memory chunk does not contain the particular object.

8. A non-transitory computer-readable memory device comprising:
   one or more instructions which, when executed by at least one processor, cause the at least one processor to form a plurality of memory chunks including a plurality of objects;
   one or more instructions which, when executed by the at least one processor, cause the at least one processor to receive, from a first device, a first request for a list of the plurality of objects;
   one or more instructions which, when executed by the at least one processor, cause the at least one processor to provide, to the first device and based on the first request, the list of the plurality of objects, the plurality of objects corresponding to a plurality of buffered pointers;
   one or more instructions which, when executed by the at least one processor, cause the at least one processor to receive, from a second device, a second request for the list of the plurality of objects;
   one or more instructions which, when executed by the at least one processor, cause the at least one processor to provide, to the second device and based on the second request, the list of the plurality of objects;
   one or more instructions which, when executed by the at least one processor, cause the at least one processor to receive, from the first device, a third request to access contents of a particular memory chunk of the plurality of memory chunks, corresponding to a first buffered pointer of the plurality of buffered pointers;
   one or more instructions which, when executed by the at least one processor, cause the at least one processor to perform, based on the third request, a first validation of the first buffered pointer;
   one or more instructions which, when executed by the at least one processor, cause the at least one processor to provide, based on a result of the first validation, access to the contents of the particular memory chunk to the first device;
   one or more instructions which, when executed by the at least one processor, cause the at least one processor to receive, from the second device, a fourth request to access the contents of the particular memory chunk;
   one or more instructions which, when executed by the at least one processor, cause the at least one processor to perform, based on the fourth request, a second validation of the first buffered pointer; and
   one or more instructions which, when executed by the at least one processor, cause the at least one processor to deny, based on a result of the second validation, access to the contents of the particular memory chunk to the second device.

9. The computer-readable memory device of claim 8, further comprising:
one or more instructions to configure the plurality of memory chunks into a binary search tree,
and where the one or more instructions to perform the first validation comprise:
one or more instructions to perform an iterative search of the binary search tree.

10. The computer-readable memory device of claim 9, further comprising:
one or more instructions to receive, from the first device, a command to delete a particular object of the plurality of objects, from the contents of the particular memory chunk; and
one or more instructions to delete, responsive to the command, the particular object.

11. The computer-readable memory device of claim 10, further comprising:
one or more instructions to reconfigure the binary search tree based on deleting the particular object.

12. The computer-readable memory device of claim 8, further comprising:
one or more instructions to end the access, to the contents of the particular memory chunk, provided to the first device;
one or more instructions to receive, from the second device, a fifth request to access the contents of the particular memory chunk;
one or more instructions to perform, responsive to the fifth request, a third validation of the first buffered pointer; and
one or more instructions to provide, based on a result of the third validation, access to the contents of the particular memory chunk to the second device.

13. The computer-readable memory device of claim 8, where the one or more instructions to perform the first validation comprise:
one or more instructions to perform the first validation, of the first buffered pointer, without accessing contents of the first buffered pointer.

14. The system of claim 8, where the first device is further to:
configure the plurality of memory chunks into a binary search tree, and
where, when performing the validation, the first device is to:
perform an iterative search of the binary search tree.

15. A system comprising:
a first device to:
form a plurality of memory chunks including a plurality of memory blocks, the plurality of memory blocks corresponding to a plurality of objects,
receive, via a network, a first request for a list of the plurality of objects;
generate, based on the first request, a plurality of pointers pointing to the plurality of objects,
buffer the plurality of pointers,
provide, via the network, the list of the plurality of objects, the plurality of objects corresponding to the buffered pointers,
receive, from a second device and via the network, a second request to access contents of a first buffered pointer of the plurality of buffered pointers,
perform, based on the second request, a validation of the first buffered pointer,
dereference the first buffered pointer when a result of the validation indicates that the first buffered pointer points to a particular object of the plurality of objects, stored in a particular memory block of the plurality of memory blocks,
provide the particular object to the second device,
determine that a third device is attempting to access the particular memory block, and
deny the third device access to the particular memory block based on the providing the particular object to the second device.

16. The system of claim 15, where the one or more devices are further to:
configure the plurality of memory chunks as nodes of at least one binary search tree, and
perform the validation by searching the at least one binary search tree in an amount of time, the amount of time being based on a quantity of the plurality of objects.

17. The system of claim 15, where the first device is further to perform the validation without accessing contents of the first buffered pointer.

18. The system of claim 15, where the first device is further to:
determine whether to grant the second request based on a result of the validation, and
grant the second request when a particular memory chunk, of the plurality of memory chunks, corresponding to the first buffered pointer, contains the particular object.

19. The system of claim 18, where the first device is further to:
deny the second request when the particular memory chunk does not contain the particular object.

20. The system of claim 15, where the first device is further to:
receive the first request or the second request from one of a firewall device, a routing device, a modem device, a gateway device, or an interface device.

* * * * *